United States Patent
Sasko et al.

(10) Patent No.: US 7,809,458 B2
(45) Date of Patent: Oct. 5, 2010

(54) PROCESS CONTROL SYSTEM WITH ABILITY TO EXCHANGE DATA WITH PRODUCTION LINE MACHINE CONTROLLERS

(75) Inventors: David A. Sasko, Pell City, AL (US); Terry W. Pennington, Calera, AL (US); George Mann, Trussville, AL (US); James A. Hranica, Tipp City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 360 days.

(21) Appl. No.: 12/059,191

(22) Filed: Mar. 31, 2008

(65) Prior Publication Data

US 2009/0248173 A1 Oct. 1, 2009

(51) Int. Cl.
*G06F 19/00* (2006.01)
(52) U.S. Cl. ........................... 700/101; 700/95
(58) Field of Classification Search ............... 700/95, 700/99–101, 108, 121, 110, 116–118, 106, 700/103, 109; 29/430, 720
See application file for complete search history.

(56) References Cited

U.S. PATENT DOCUMENTS

| | | | |
|---|---|---|---|
| 4,930,086 A | 5/1990 | Fukasawa | |
| 5,121,331 A | 6/1992 | Lovrenich | |
| 5,325,582 A | 7/1994 | Glaser et al. | |
| 5,432,702 A | 7/1995 | Barnett | |
| 6,092,001 A | 7/2000 | Mizuno et al. | |
| 6,148,245 A | 11/2000 | Lynch et al. | |
| 6,381,509 B1 | 4/2002 | Thiel et al. | |
| 6,453,210 B1 | 9/2002 | Belotserkovskiy et al. | |
| 6,502,765 B1 * | 1/2003 | Chase | 239/227 |
| 6,725,116 B2 | 4/2004 | Sanada et al. | |
| 6,732,005 B1 | 5/2004 | Bobkin et al. | |
| 6,766,208 B2 * | 7/2004 | Hsieh | 700/109 |
| 6,775,582 B2 | 8/2004 | Schaaf et al. | |
| 6,839,604 B2 | 1/2005 | Godfrey et al. | |
| 6,876,898 B1 | 4/2005 | Hranica et al. | |
| 7,086,518 B1 | 8/2006 | Hranica et al. | |
| 7,225,043 B2 | 5/2007 | Ishigaki | |
| 7,228,192 B2 * | 6/2007 | Popplewell | 700/115 |
| 7,260,441 B2 | 8/2007 | Hranica et al. | |
| 7,319,912 B2 * | 1/2008 | Park et al. | 700/116 |
| 7,653,451 B2 * | 1/2010 | Denton et al. | 700/99 |
| 7,660,645 B2 * | 2/2010 | Izumi et al. | 700/121 |
| 2003/0040826 A1 | 2/2003 | Hawman et al. | |
| 2003/0233161 A1 * | 12/2003 | Cheng et al. | 700/108 |
| 2005/0228528 A1 | 10/2005 | Farchmin et al. | |
| 2007/0050075 A1 | 3/2007 | Johnson et al. | |

* cited by examiner

*Primary Examiner*—Kidest Bahta
(74) *Attorney, Agent, or Firm*—Standley Law Group LLP

(57) ABSTRACT

A system and method for integrating a production line process control system (PCS) with production line machine controllers to record data about processes completed on a production line. The PCS receives data from line controllers regarding processes that are completed on each part. Process data including process order data is stored by the PCS and used to instruct line controllers on whether a particular part should be accepted for machining or handled in another way. Rejected parts are flagged electronically so when they arrive at a subsequent line controller, they are directed to a chute containing parts removed from the production process. The PCS and line controllers exchange data about each part and applicable processes as it proceeds through production. The PCS records the data to develop a complete part history. The PCS integrates with a plant quality and tracking system that records the historical data.

30 Claims, 13 Drawing Sheets

| CS_ON_SERIAL_NUMBER | AREA_NAME | PROCESS_ABREVIATION | PROCESS_POINT_ID | PROCESS_TIMESTAMP |
|---|---|---|---|---|
| RDJ0TF7403389224QY | Crankshaft | OH | OH1_OFF | 2007-04-18-04.05.58.000000 |
| RDJ0TF7403389054QY | Crankshaft | OH | OH1_OFF | 2007-04-18-04.11.24.000000 |
| RDJ0TF7403389104QY | Crankshaft | OH | OH1_OFF | 2007-04-18-04.16.51.000000 |
| RDJ0TF7403388904QY | Crankshaft | OH | OH1_OFF | 2007-04-18-04.22.17.000000 |
| RDJ0TF7403388914QY | Crankshaft | OH | OH1_OFF | 2007-04-18-04.27.44.000000 |
| RDJ0TF7403388734QY | Crankshaft | OH | OH1_OFF | 2007-04-18-04.33.11.000000 |
| RDJ0TF7403388964QY | Crankshaft | OH | OH1_OFF | 2007-04-18-04.43.19.000000 |
| RDJ0TF7403389034QY | Crankshaft | OH | OH1_OFF | 2007-04-18-04.48.45.000000 |
| RDJ0TF7403388834QY | Crankshaft | OH | OH1_OFF | 2007-04-18-04.54.12.000000 |
| RDJ0TF7403388984QY | Crankshaft | OH | OH1_OFF | 2007-04-18-04.59.38.000000 |
| RDJ0TF7403388694QY | Crankshaft | OH | OH1_OFF | 2007-04-18-05.06.35.000000 |
| RDJ0TF7403389754QY | Crankshaft | OH | OH1_OFF | 2007-04-18-05.12.14.000000 |
| RDJ0TF7403388957QY | Crankshaft | OH | OH1_OFF | 2007-04-18-05.18.23.000000 |
| RDJ0TF7403389774QY | Crankshaft | OH | OH1_OFF | 2007-04-18-05.25.31.000000 |
| RDJ0TF7403388644QY | Crankshaft | OH | OH1_OFF | 2007-04-18-05.30.58.000000 |
| RDJ0TF7403388404QY | Crankshaft | OH | OH1_OFF | 2007-04-18-05.36.24.000000 |
| RDJ0TF7403388484QY | Crankshaft | OH | OH1_OFF | 2007-04-18-05.41.51.000000 |
| RDJ0TF7403388954QY | Crankshaft | OH | OH1_OFF | 2007-04-18-05.47.17.000000 |
| RDJ0TF7403389794QY | Crankshaft | OH | OH1_OFF | 2007-04-18-05.52.43.000000 |
| RDJ0TF7403388054QY | Crankshaft | OH | OH1_OFF | 2007-04-18-05.58.10.000000 |
| RDJ0TF7403388754QY | Crankshaft | OH | OH1_OFF | 2007-04-18-06.03.37.000000 |
| RDJ0TF7403388794QY | Crankshaft | OH | OH1_OFF | 2007-04-18-06.09.03.000000 |
| RDJ0TF7403388774QY | Crankshaft | OH | OH1_OFF | 2007-04-18-06.14.30.000000 |
| RDJ0TF7403388144QY | Crankshaft | OH | OH1_OFF | 2007-04-18-06.19.56.000000 |
| RDJ0TF7403388594QY | Crankshaft | OH | OH1_OFF | 2007-04-18-06.25.22.000000 |
| RDJ0TF7403388634QY | Crankshaft | OH | OH1_OFF | 2007-04-18-06.30.49.000000 |
| RDJ0TF7403388964QY | Crankshaft | OH | OH1_OFF | 2007-04-18-06.36.15.000000 |
| RDJ0TF7403388764QY | Crankshaft | OH | OH1_OFF | 2007-04-18-06.41.42.000000 |
| RDJ0TF7403388494QY | Crankshaft | OH | OH1_OFF | 2007-04-18-06.47.08.000000 |
| RDJ0TF7403388564QY | Crankshaft | OH | OH1_OFF | 2007-04-18-06.52.35.000000 |
| RDJ0TF7403388364QY | Crankshaft | OH | OH1_OFF | 2007-04-18-06.58.01.000000 |
| RDJ0TF7403388524QY | Crankshaft | OH | OH1_OFF | 2007-04-18-07.03.28.000000 |
| RDJ0TF7403388444QY | Crankshaft | OH | OH1_OFF | 2007-04-18-07.08.54.000000 |
| RDJ0TF7403388234QY | Crankshaft | OH | OH1_OFF | 2007-04-18-07.14.20.000000 |
| RDJ0TF7403388274QY | Crankshaft | OH | OH1_OFF | 2007-04-18-07.19.46.000000 |

| CS_ON_SERIAL_NUMBER | AREA_NAME | PROCESS_ABREVIATION | PROCESS_POINT_ID | PROCESS_TIMESTAMP |
|---|---|---|---|---|
| RDJ0TF74033389340Y | Crankshaft | OH | OH1_OFF | 2007-04-18-04.54.12.000000 |
| RDJ0TF74033389840Y | Crankshaft | OH | OH1_OFF | 2007-04-18-04.59.38.000000 |
| RDJ0TF74033389940Y | Crankshaft | OH | OH1_OFF | 2007-04-18-05.06.35.000000 |
| RDJ0TF74033389754 0Y | Crankshaft | OH | OH1_OFF | 2007-04-18-05.12.14.000000 |
| RDJ0TF74033389574 0Y | Crankshaft | OH | OH1_OFF | 2007-04-18-05.18.23.000000 |
| RDJ0TF74033389644 0Y | Crankshaft | OH | OH1_OFF | 2007-04-18-05.25.31.000000 |
| RDJ0TF74033389644 0Y | Crankshaft | OH | OH1_OFF | 2007-04-18-05.30.58.000000 |
| RDJ0TF74033389404 0Y | Crankshaft | OH | OH1_OFF | 2007-04-18-05.36.24.000000 |
| RDJ0TF74033389484 0Y | Crankshaft | OH | OH1_OFF | 2007-04-18-05.41.51.000000 |
| RDJ0TF74033389524 0Y | Crankshaft | OH | OH1_OFF | 2007-04-18-05.47.17.000000 |
| RDJ0TF74033387984 0Y | Crankshaft | OH | OH1_OFF | 2007-04-18-05.52.43.000000 |
| RDJ0TF74033387974 0Y | Crankshaft | OH | OH1_OFF | 2007-04-18-05.58.10.000000 |
| RDJ0TF74033388054 0Y | Crankshaft | OH | OH1_OFF | 2007-04-18-06.03.37.000000 |
| RDJ0TF74033387854 0Y | Crankshaft | OH | OH1_OFF | 2007-04-18-06.09.03.000000 |
| RDJ0TF74033387904 0Y | Crankshaft | OH | OH1_OFF | 2007-04-18-06.14.30.000000 |
| RDJ0TF74033387784 0Y | Crankshaft | OH | OH1_OFF | 2007-04-18-06.19.56.000000 |
| RDJ0TF74033387814 0Y | Crankshaft | OH | OH1_OFF | 2007-04-18-06.25.22.000000 |
| RDJ0TF74033387594 0Y | Crankshaft | OH | OH1_OFF | 2007-04-18-06.30.49.000000 |
| RDJ0TF74033387634 0Y | Crankshaft | OH | OH1_OFF | 2007-04-18-06.36.15.000000 |
| RDJ0TF74033387694 0Y | Crankshaft | OH | OH1_OFF | 2007-04-18-06.41.42.000000 |
| RDJ0TF74033387494 0Y | Crankshaft | OH | OH1_OFF | 2007-04-18-06.47.08.000000 |
| RDJ0TF74033387564 0Y | Crankshaft | OH | OH1_OFF | 2007-04-18-06.52.35.000000 |
| RDJ0TF74033387364 0Y | Crankshaft | OH | OH1_OFF | 2007-04-18-06.58.01.000000 |
| RDJ0TF74033387524 0Y | Crankshaft | OH | OH1_OFF | 2007-04-18-07.03.28.000000 |
| RDJ0TF74033387444 0Y | Crankshaft | OH | OH1_OFF | 2007-04-18-07.08.54.000000 |
| RDJ0TF74033387234 0Y | Crankshaft | OH | OH1_OFF | 2007-04-18-07.14.20.000000 |
| RDJ0TF74033387274 0Y | Crankshaft | OH | OH1_OFF | 2007-04-18-07.19.46.000000 |
| RDJ0TF74033387114 0Y | Crankshaft | OH | OH1_OFF | 2007-04-18-07.25.13.000000 |
| RDJ0TF74033387134 0Y | Crankshaft | OH | OH1_OFF | 2007-04-18-07.30.39.000000 |
| RDJ0TF74033387194 0Y | Crankshaft | OH | OH1_OFF | 2007-04-18-07.36.01.000000 |
| RDJ0TF74033386984 0Y | Crankshaft | OH | OH1_OFF | 2007-04-18-07.43.29.000000 |
| RDJ0TF74033387034 0Y | Crankshaft | OH | OH1_OFF | 2007-04-18-07.49.33.000000 |
| RDJ0TF74033386904 0Y | Crankshaft | OH | OH1_OFF | 2007-04-18-07.59.06.000000 |
| RDJ0TF74033386854 0Y | Crankshaft | OH | OH1_OFF | 2007-04-18-08.04.32.000000 |
| RDJ0TF74033386774 0Y | Crankshaft | OH | OH1_OFF | 2007-04-18-08.09.59.000000 |
| RDJ0TF74033386824 0Y | Crankshaft | OH | OH1_OFF | 2007-04-18-08.15.25.000000 |
| RDJ0TF74033386644 0Y | Crankshaft | OH | OH1_OFF | 2007-04-18-08.20.51.000000 |
| RDJ0TF74033386784 0Y | Crankshaft | OH | OH1_OFF | 2007-04-18-08.26.18.000000 |
| RDJ0TF74033386494 0Y | Crankshaft | OH | OH1_OFF | 2007-04-18-08.31.44.000000 |
| RDJ0TF74033386554 0Y | Crankshaft | OH | OH1_OFF | 2007-04-18-08.37.10.000000 |
| RDJ0TF74033386594 0Y | Crankshaft | OH | OH1_OFF | 2007-04-18-08.42.37.000000 |
| RDJ0TF74033386434 0Y | Crankshaft | OH | OH1_OFF | 2007-04-18-08.54.24.000000 |
| RDJ0TF74053103840Z | Crankshaft | OH | OH1_OFF | 2007-04-18-09.09.53.000000 |
| | Crankshaft | OH | OH1_OFF | 2007-04-18-09.15.19.000000 |

PROCESS CONTROL SYSTEM WITH ABILITY TO EXCHANGE DATA WITH PRODUCTION LINE MACHINE CONTROLLERS

BACKGROUND OF THE INVENTIVE FIELD

The present invention is directed to manufacturing production line systems and methods. In particular, the present invention is directed to a system and method for integrating a production process control system (PCS) with production line machine controllers to record and track data regarding production line processes.

Automotive manufacturers today dedicate a substantial amount of resources to quality process improvements. Prior quality efforts have resulted in the development and implementation of production line systems and methods that are directed to improving various aspects of the production process. For example, U.S. Pat. No. 6,876,898, which is incorporated herein by reference, is directed to a method for identifying workstations that performed work on a part in a production line that assists production associates in determining which workstations on the line may be responsible for producing defective parts. As each part progresses through the workstations, it is marked with indicators that identify each workstation that performed work on the part. Another example as described in U.S. Pat. No. 7,086,518, incorporated herein by reference, is a system and method for bypassing workstations on a production line that may be producing defective parts. Finally, U.S. Pat. No. 7,260,441, which is incorporated herein by reference, is directed to a system and method for inspecting a part during a production run in which parts are supplied to workstations by an autoloader.

Although prior art systems and methods provide information about activities occurring at specific workstations and autoloaders for production line machinery, they do not provide information about the overall production process and do not track or provide information about the parts that have been processed through the workstations. In current systems, it is possible for parts that have not completed all required steps in a machining process to continue advancing on a production line. A process may be missed due to a malfunction that occurs in a workstation while the workstation is operating on a part. It may appear to an associate monitoring the process that the part completed the process when in fact it did not. The part may proceed through production without having completed an important process. In other instances, one or more processes may be missed because an entire area in the production line is shut down for maintenance. Efforts to avoid the non-operational equipment may result in parts proceeding through production without having completed certain processes. In either case, parts that have not been processed completely may proceed through production and cause quality problems in the resulting product.

In many cases, the fact that a part missed a production process is not obvious to a human inspector or even to a computerized inspection system. When defects attributable to missed production processes are detected, parts may be "tagged" such that a hold tag is attached to a part indicating it should not be used in production. Parts may further be physically separated or quarantined from the production process. Reliance on such physical means to detect missed process defects and to further quarantine parts, however, are not always effective in removing defective parts from production and ensuring the defective parts are not reintroduced to the production process. An associate on the production line may not realize that a part is defective or that it has been quarantined (e.g., because the tag is incorrect or falls off or because the part is not in a quarantined area) and may reintroduce the part to the production process. The resultant problems may not be detected until later in the production process or even after the production process is completed when determining the source of the problem is more difficult.

There is a need for a system and method that uses part traceability information and production process information to reduce part defects attributable to missed processes. There is a need for a system and method that integrates a production process control system with production line machine controllers to increase the likelihood that all processes in a production line are completed for each part. There is also a need for a system and method that uses part quality and traceability information to reduce the time required to locate suspect parts in an automated production line. There is a need for a system and method that improves part quality and traceability to ensure that quarantined parts are permanently removed from the automated production line. There is need for a system and method that integrates information about activities occurring at specific workstations and autoloaders with the overall production process to improve product quality.

SUMMARY OF THE GENERAL INVENTIVE CONCEPT

The present invention is directed to a system and method for integrating a production line process control system (PCS) with production line machine controllers to ensure processes on a production line are completed. PCS data is communicated to production machine line controllers that use the PCS data in determining whether a part should be accepted for machining or handled in some other way. Information about completion of the machining process is then communicated to the PCS. The two-way communication between the PCS and production line machine controllers supports part and production process traceability, increases the likelihood that all processes in the production line are completed for a particular part, and reduces part defects attributable to missed processes.

A PCS may be implemented with a real-time database to create and update process history records for every part as it proceeds down a production line. The PCS collects data, controls part flow, and ensures that each part passes through production line processes in a specified order. It may be used to apply "electronic flags" to a part history to ensure that quality checks and repairs are completed and recorded before a specific part is accepted by a production line machine or other piece of production equipment. When the PCS is implemented with quality stations, part histories may be modified so that parts can be directed through subsequent processes, quarantined or contained at specific locations, or removed from the production line. Additionally, the historical part data collected may be used for part locating, lot controls, and traceability.

The production line machines and devices are linked to the PCS using a network with sufficient speed to pass data to and from the PCS within allotted cycle time. The PCS provides an efficient method of interfacing the PLCs of the production line machinery to a plant quality and tracking system that records historical data including measurement, inspection, and/or process data regarding parts.

Each part is assigned a unique part identifier or serial number so that it may be tracked as it progresses down the production line. In an example embodiment, the part identifier is encoded in a 2D barcode on a part. A 2D barcode camera is positioned to read a part identifier before it enters a production line machine. The PLC receives the part identifier and uses the part identifier to instruct the PCS to perform a function or procedure to retrieve and return data to the PLC, create a new part or part history record, or update the respective part's process data. Based on the result of this transaction, the PLC determines how to manage the part. The part may be directed to the desired machine for processing or removed from the system and transferred to a defective part chute. Other actions may be programmed in the PLC.

BRIEF DESCRIPTION OF THE DRAWINGS

FIGS. 6-12 are screens for a web-based administration and reporting application according to an example embodiment of the present invention.

DETAILED DESCRIPTION OF EXEMPLARY EMBODIMENT(S)

Figure 1:
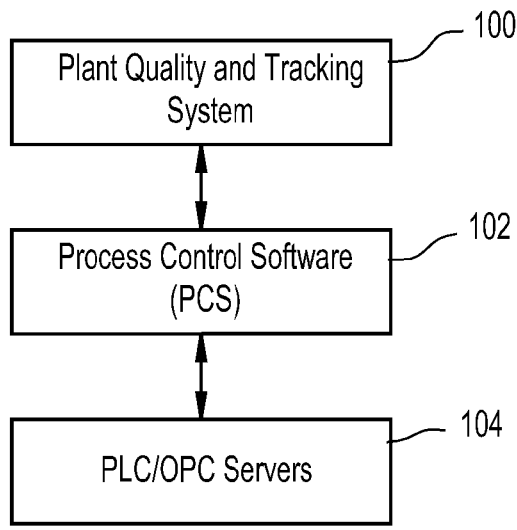
FIG. 1 is a first block diagram illustrating the integration of a Process Control System (PCS) with production line machine controllers and a plant quality and tracking system according to an example embodiment of the present invention.

Referring to FIG. 1, a first block diagram illustrating the integration of a Process Control System (PCS) with production line machine controllers and a plant quality and tracking system for an example embodiment of the present invention is shown. As shown in FIG. 1, the PCS 102 facilitates two-way communication between a plant quality and tracking system 100 and production line machine controllers 104 to track processes completed on parts progressing on the production line. A process is a series of operations performed in the making or treatment of a part. The PCS operates in conjunction with the production line machine controllers (PLCs) to track parts by part identifier or serial number and maintain a complete historical record of each part as it progresses through the machining process. The PCS collects data, controls part flow, and ensures that each part passes through the machining processes in a specified order. It also applies flags to suspect part history to ensure quality checks and repairs are completed and recorded before a specific part is accepted by a production line machine. When connected to quality stations located on the production line, part histories may be modified by associates so that parts are directed through processes, quarantined at specific locations on the production line, or removed from the production line. Additionally, the historical data that is collected can be used for part locating, lot controls, and traceability.

Parts used in the production process are assigned a part identifier or serial number. The part identifier is encoded on the part using, for example, a barcode, a RFID tag, or any other type of marking or tag that can be detected using cameras, sensors, or other input devices on a production line. A 2D barcode camera or other input device may be positioned on a production line to read a part identifier before it enters a production line machine. The part identifier is then used to locate information about the part from the PCS and to direct further action performed by the production line machine controllers. When an input device and PLC reads the part identifier or serial number of a suspect part that has been flagged by the PCS, but not physically quarantined, the PCS replies with a "no good" status indicator that informs the PLC that the part should not be used (e.g., is on hold or has been scrapped). If the "no good" condition is detected, the PLC commands the machine to remove the part from production and send it to a "no good" chute.

Figure 2:
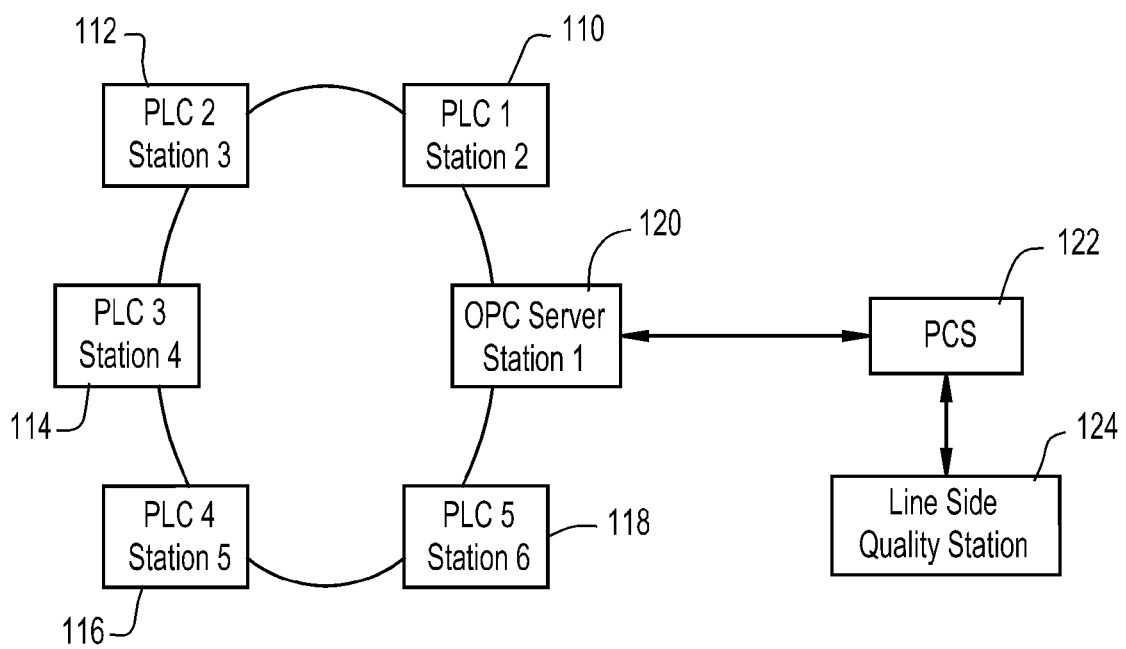
FIG. 2 is a second block diagram illustrating details of a Process Control System (PCS) integrated with production line machine controllers according to an example embodiment of the present invention.

Referring to FIG. 2, a second block diagram illustrating details of a Process Control System (PCS) integrated with production line machine controllers according to an example embodiment of the present invention is shown. The PCS 122 connects to an OPC or controller server 120 and may optionally be connected to a production line side quality station 124. In an example embodiment of a system according to the present invention, the OPC or controller server 120 operates according to the industrial open connectivity standard based on Microsoft® COM or DCOM objects OLE (Object, Linking, and Embedding) for Process Control. The OPC or controller server 120 communicates with a plurality of PLC stations 110, 112, 113, 116, 118 connected to machines or other equipment on the production line. In an example embodiment of a system according to the present invention, each station in the network is assigned I/O points to be used as triggers and registers for each PCS access area needed by the station. Within the register blocks, I/O is designated for a machine identifier (MACH_ID), a process point type (PPT), a part identifier or serial number and any data that is to be stored with a part number.

In an example embodiment of a system according to the present invention, a web-based administration application provides features and functionality for configuring PCS OPC clients and OPC clients processes that are tracked by the PCS. The web-based administration application comprises various screens for prompting a user to enter data and information relevant to process configuration. The web-based administration application also supports reporting and analysis of part history and process completion data.

PCS OPC Client Details

Figure 3:
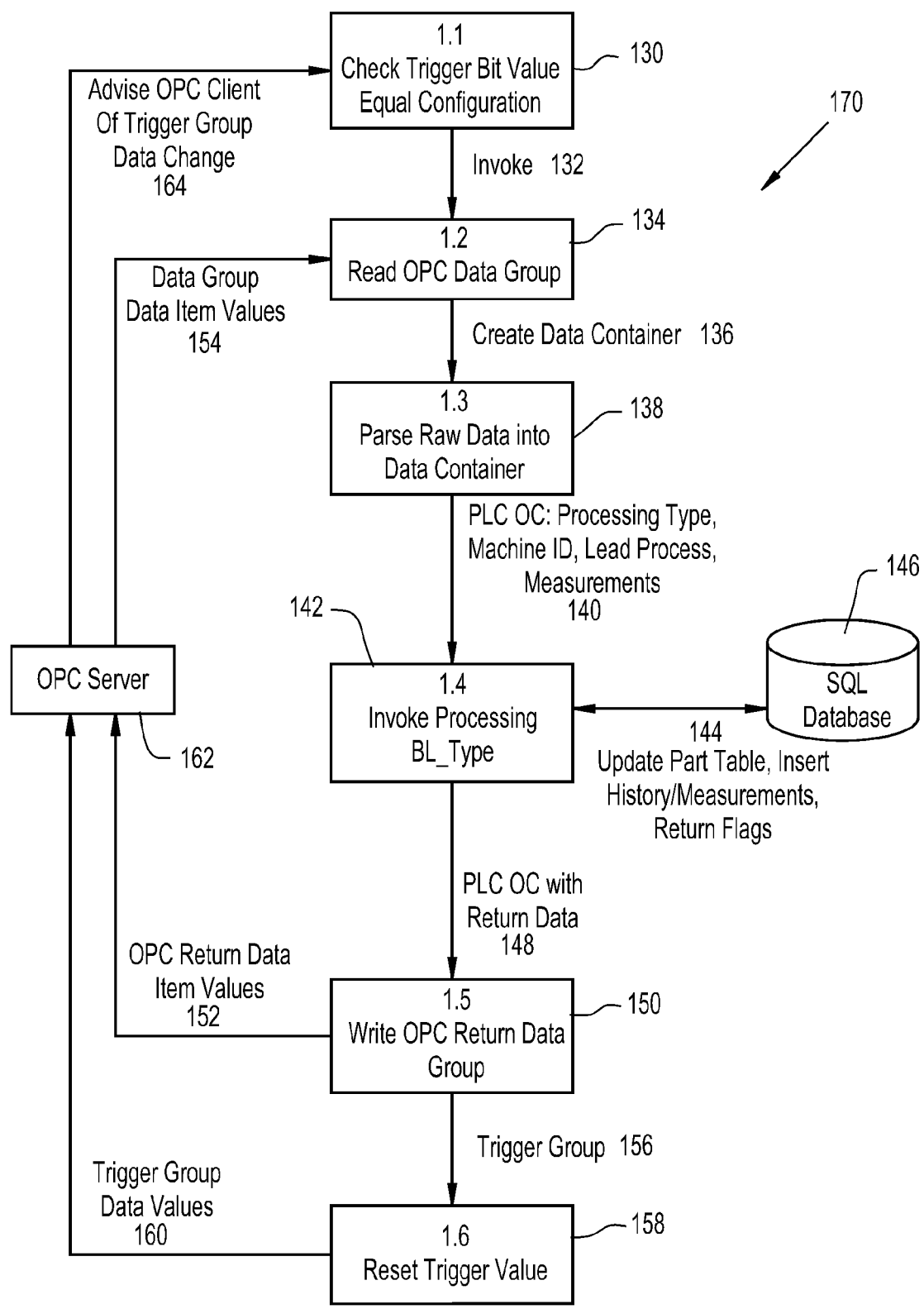
FIG. 3 is a flow diagram illustrating operation of a PCS OPC client executing as a service to interact with OPC servers to send and receive part processing, status, and quality control data to production line machine controllers according to an example embodiment of the present invention.

Referring to FIG. 3, a flow diagram illustrating operation of a PCS OPC client that interacts with OPC servers and production line machine controllers according to an example embodiment of the present invention is shown. In an example embodiment of a system of the present invention, the PCS client 170 is an OPC client written in Visual Basic for the Microsoft®.NET framework (VB.NET) that connects to Takebishi® OPC servers 162 using OPC connections. It also records and retrieves data from a Microsoft® SQL or IBM® DB2 database 146.

The PCS OPC client 170 is configured via an XML generated file that loads to memory when the PCS service is started. The data table within the tables is entered via web administration application screens. The PCS OPC client 170 manages trigger events initiated by PLCs. The PCS OPC client 170 registers a particular bit in the PLC in "advised mode" in the OPC server 162. Advised mode means that whenever the bit changes in the PLC, the OPC server 162 notifies the PCS OPC client that a change has occurred 162. The PCS OPC client then checks the trigger bit value 130. If the value equals the configured value 132, the raw data group 134 is read from the OPC server 154 into a data container 136 that is parsed 138 to determine the required processing. The raw data has a process point type (PPT) which is an integer representing the computer instructions or business logic to be performed 140 in relation to the data received from the PLC. The raw data also has the part identifier or serial number. Based on the process point type (PPT), the PCS OPC client executes the associated computer instructions or business logic 142. The PLC provides return data relevant to the completed business logic processing 148. A write return data process 150 provides the OPC return data values 152 to the OPC server 162. When the business logic is complete, the database 146 is updated with information regarding the part as well as applicable measurements, history, return flags, etc. 144. A trigger group process 156 causes the trigger value to be reset 158. The trigger group data values 169 are then communicated to the OPC server 162.

The PCS OPC client tracks parts through different process point types (PPT) from the beginning of a production line area (AREA-ON) to the end of an area (AREA_OFF). A process point is defined to be a logical point where data is exchanged between the PCS and the PLCs. The system records date and time stamps for each part through each process point on the production line. Applicable measurement data (e.g., torques, angles, container numbers, etc) are also recorded at each process point. The data recorded by the PCS in the database may then be communicated to the plant quality and tracking system.

Example Process Point Types (PPTs) for the desired functions and procedures in the PCS are as follows:

To facilitate process configuration, in an example embodiment of a system according to the present invention, each machine on a production line is assigned a unique identifier that is a combination of a process and a machine. The machine identifiers allow the PCS to determine whether parts have been processed according to a defined order. Starting with "1," each process is numbered sequentially through the end of the production line. Process number 1 is designated 01, process 2 is 02, and so on until each process is assigned a number. The machine component is determined by the number of machines that perform a particular process. If multiple machines perform the same process, they are also numbered sequentially starting with "1." Each machine is assigned a single digit for a maximum of nine machines that perform a particular process.

For example, the following five steps or processes may be used to produce a part:

Process 01—Cutting
Process 02—Drilling
Process 03—Heat Treat
Process 04—Measuring
Process 05—Packing Process 01 requires two machines (Machine 1, Machine 2), process 02 requires three machines (Machine 1, Machine 2, Machine 3), and process 03 through 05 requires one machine

TABLE 1

Process Point Types (PPTs)

| Number | Process Point Type PPT | Description |
|---|---|---|
| 1 | AREA_ON | Instructs PCS to create a new part record in the database. When a part is first detected by the production system and a record is created, the part goes AREA_ON. |
| 2 | PICK_UP | Used by PLC to query the database. When a machine first encounters a part, the part is "Picked Up." The machine uses the PICK_UP PPT to query the database to determine the status or history of the part. |
| 3 | MACH_OFF | Informs PCS that a part has successfully finished processing by a machine. PCS updates the database to the next process (so the part can proceed on the production line), creates a date/time stamp, and stores any desired data to the part history. |
| 4 | QC_ON | Informs PCS that a part has been removed from a specific machine and delivered to a quality station for inspection or repair. PCS automatically turns "ON" a quality flag bit for this part. The flag is passed back to the PLC as part of any subsequent PPT transaction between the PLC and the PCS. If the PLC senses this bit is "ON" for a part, the PLC routes the part to either a quality station or a defective part chute depending on the particular machine layout. |
| 5 | SET_PROCESS | Causes a change to the "NEXT_PROCESS" of a part. The NEXT_PROCESS is a value returned by the PCS to the PLC that represents the process number for the next process the part is required to complete. |
| 6 | LOAD | Informs PCS that a part has been loaded in a machine. PCS updates the database with a rack or container identifier and inserts history and measurement data. |
| 7 | AREA_OFF | Informs PCS that a part has finished processing and is now packed and ready to ship. Any data can be stored against the part history with this type. Usually the rack or container identifier is stored so the part can easily be traced for lot control activities. |
| 8 | MACH_ON | Informs PCS that a part has been loaded into a machine for processing. PCS creates a date/time stamp in the history data for that part. |
| 9 | MACH_EX | Informs PCS that a part was in a machine when a machine alarm occurred. PCS creates a date/time stamp in the history data for that part. | each (Machine 1). These numbers may then be combined to give each machine a unique process/machine identifier (MACH_ID).

TABLE 2

Process/Machine Combinations

| Process - Machine Combination | Machine Identifier (Mach_ID) |
|---|---|
| Process 01, Machine 1 | 011 |
| Process 01, Machine 2 | 012 |
| Process 02, Machine 1 | 021 |
| Process 02, Machine 2 | 022 |
| Process 02, Machine 3 | 023 |
| Process 03, Machine 1 | 031 |
| Process 04, Machine 1 | 041 |
| Process 05, Machine 1 | 051 |

In an example embodiment of a system according to the present invention applied to crankshaft and connecting rod manufacturing, the following process/machine identifiers may be used.

TABLE 3

Process/Machine Identifiers for Crankshaft and Connecting Rod Manufacturing

| Machine | Abbreviation | MACH_ID |
|---|---|---|
| Centering | CNTR | 011 |
| Journal Mill 1 | JM1 | 021 |
| Journal Mill 2 | JM2 | 022 |
| Numerical Control 1 | NC1 | 031 |
| Numerical Control 2 | NC2 | 032 |
| Numerical Control 3 | NC3 | 033 |
| Pin Mill 1 | PM1 | 041 |
| Pin Mill 2 | PM2 | 042 |
| Burnish Machine 1 | BR1 | 051 |
| Burnish Machine 2 | BR2 | 052 |
| End Hole Drill 1 | EH1 | 061 |
| End Hole Drill 2 | EH2 | 062 |
| End Hole Drill 3 | EH3 | 063 |
| End Hole Drill 4 | EH4 | 064 |
| Cross Oil Hole 1 | COH1 | 071 |
| Cross Oil Hole 2 | COH2 | 072 |
| Cross Oil Hole 3 | COH3 | 073 |
| Cross Oil Hole 4 | COH4 | 074 |
| Cross Oil Hole 5 | COH5 | 075 |
| Cross Oil Hole 6 | COH6 | 076 |
| Cross Oil Hole 7 | COH7 | 077 |
| Right Flange Grind | RFG1 | 081 |
| Journal Grind | JG1 | 091 |

TABLE 3-continued

Process/Machine Identifiers for Crankshaft and Connecting Rod Manufacturing

| Machine | Abbreviation | MACH_ID |
|---|---|---|
| Pin Grind 1 | PG1 | 101 |
| Pin Grind 2 | PG2 | 102 |
| Pin Grind 3 | PG3 | 103 |
| In Line Measuring | ILM1 | 111 |
| Pre Bend | PB1 | 121 |
| IGSN Process | IGSN1 | 131 |
| Oil Hole Deburr | OHD1 | 141 |
| Oil Hole Sealing | OHS1 | 151 |
| Bend Correct | BC1 | 161 |
| Fine Bore 1 | FB1 | 171 |
| Balance Machine 1 | BAL1 | 181 |
| Balance Machine 2 | BAL2 | 182 |
| Balance Machine 3 | BAL3 | 183 |
| Balance Machine 4 | BAL4 | 184 |
| Thrust Polish | LSF1 | 191 |
| Super Finish 1 | SF1 | 201 |
| Ultra Finish 1 | UF1 | 211 |
| Measure & Marking | MM1 | 221 |
| Rough Bore 1 | RB1 | 011 |
| Rough Bore 2 | RB2 | 012 |
| Bolt Hole Tap 1 | BHD1 | 021 |
| Bolt Hole Tap 2 | BHD2 | 022 |
| Bolt Hole Drill 1 | BHT1 | 031 |
| Blot Hole Drill 2 | BHT2 | 032 |
| Fracture | FRAC1 | 041 |
| Double Disc Grind 1 | DDG1 | 051 |
| Double Disc Grind 2 | DDG2 | 052 |
| Semi-Finish I | SF1 | 061 |
| Semi-Finish 2 | SF2 | 062 |
| Oil Hole Transfer 1 | OHT1 | 071 |
| Fine Bore 1 | FB1 | 081 |
| Fine Bore 2 | FB2 | 082 |
| Honing 1 | HON1 | 091 |
| Washing 1 | WASH | 101 |
| Measure & Marking | MM1 | 111 |

In the web-based administration application according to an example embodiment, defining a new area or new part line involves defining a department along with the domain groups that have rights to that department. Each new area may have a department and group. This data is entered into the database prior to an administrator accessing the PCS administration screens to complete additional tasks. The following table summarizes the screens with which the administrator interacts and the tasks that are performed to configure processes as well as quality tracking for the PCS according to an example embodiment of the present invention.

TABLE 4

Process Configuration Screens and Tasks

| Screen | Actions | User Interface |
|---|---|---|
| Area Screen | Select Department | User selects active areas for department appearing in data grid or selects add area option. |
| | Add an Area | User enters an area name and a description. |
| | Modify an Area | User selects an area from list and changes name or description. |
| | Disable an Area | User selects an area from list and deletes it. |
| Process Screen | Select Department and Area | User selects a department and an area from list and an option. |
| | Add a Process | User enters sequence number, name, process number, and description. System checks for sequence numbers in use. |
| | Modify a Process | User selects a process and changes sequence number, name, process number or description. |
| | Disable a Process | User selects a process from list and deletes it. |

TABLE 4-continued

Process Configuration Screens and Tasks

| Screen | Actions | User Interface |
|---|---|---|
| Reason Screen | Select Department and Area | User selects a department and an area from list and an option. |
| | Add a Reason | User enters a reason. |
| | Modify a Reason | User selects a reason and changes it. |
| | Disable a Reason | User selects a reason and deletes it. |
| Actions Screen | Add Actions | Actions are entered into database and used in creating Process-Reason links. |
| Process-Reason Link Screen | Select Department, Area, Process, and Action | User selects a department, an area, a process, and an action. (Example: for process Journal Mill and action Repair: Reason = Misalignment and Next Process = Centering) |
| | Add a Process-Reason Link | Select Process/Action and select a reason from list. Optionally select a next process for the reason. |
| | Modify a Process-Reason Link | User selects a process-reason link and changes it |
| | Disable a Process-Reason Link | User selects a process-reason link and deletes it. |
| Process Point Type Screen | Select Department and Area | User selects a department and an area from list and an option. |
| | Add a Process Point Type | User enters a process point type and a type number. |
| | Modify a Process Point Type | User selects a process point type and a number and changes it. |
| | Disable a Process Point Type | User selects a process point type and deletes it. |
| Process Point Screen | Select Department, Area, and Process | User selects a department, an area, and a process for selected department/area. |
| | Add a Process Point | User enters a process point identifier, description, PLC machine identifier and selects a type from a list. |
| | Modify a Process Point | User selects a process point and changes it. |
| | Disable a Process Point | User selects a process point and deletes it. |
| Required Measurements Screen | Select Department, Area, and Process | User selects a department, an area, a process and a process point. Data grid displays required measurements for selected process point. |
| | Add a Required Measurement | User enters data for a selected process point. |
| | Modify a Required Measurement | User selects a process point and changes measurements for it. |
| | Disable a Required Measurement | User selects a process point and deletes the measurements. |

OPC Client Configuration

OPC clients communicate with the OPC server that services one or more production line machine PLCs. The web-based administration application provides features and functionality for configuring the OPC client to track part data.

TABLE 5

OPC Client Configuration Screens and Tasks

| Screen | Action | User Interface |
|---|---|---|
| Part Database Screen | Select Department and Area | User selects a department and an area. |
| | Add a Part Database | One part database for each area may be added. User enters name, connection string (to AREA_PCS database), name of part table, part history table, and part measurement table. |
| | Modify a Part Database | User selects a part database and changes it. |
| | Disable a Part Database | User selects a part database and deletes it. |
| OPC Server Screen | Select Department and Area | User selects a department and an area. Data for OPC servers in area is displayed. |
| | Add an OPC Server | User enters a node name and connection string (to an OPC server on specified node). |
| | Modify an OPC | User selects an OPC server and changes it. |

TABLE 5-continued

OPC Client Configuration Screens and Tasks

| Screen | Action | User Interface |
|---|---|---|
| | Server Disable an OPC Server | User selects an OPC server and deletes it. |
| Thread Screen | Select Department, Area, and OPC Server | User selects a department and an area. Data for threads in selected OPC server in area is displayed. |
| | Add a Thread | User enters a name and class for new OPC server. |
| | Modify a Thread | User selects a thread and changes it. |
| | Disable a Thread | User selects a thread and deletes it. |
| Thread APP Screen | Select Department, Area, and OPC Server | User selects a department, an area, and an OPC server. Data for threads APPs in selected OPC server in area is displayed. |
| | Add a Thread APP | User enters a name, description, trigger bit, trigger value, and class. |
| | Modify a Thread APP | User selects a thread APP and changes it. |
| | Disable Thread APP | User selects a thread APP and changes it. |
| Data Item Screen | Select Department, Area, OPC Server, Thread, and Thread APP | User selects a department, an area, an OPC server, a thread, and a thread APP. Data for data items in selected thread APP are displayed. |
| | Add a Data Item | User enters a name, channel, device, register prefix, start value, and length. User enters value true or false for ASCII trigger. User enters data item type. |
| | Modify a Data Item | User selects a data item and changes it. |
| | Disable a Data Item | User selects a data item and deletes it. |

PCS-PLC Communications

The following flags and parameters are used by the PCS 30 and PLC to communicate data regarding parts and details of parts processing.

TABLE 6

PCS/PLC Communication Parameters

| Flag | Description |
|---|---|
| QC_FLAG | Set to the part history table by PCS when a PLC notifies PCS that a part has gone QC_ON. If a PLC detects this signal, the PLC rejects the part from the system. The part cannot reenter the system until an inspection or repair has been completed and recorded on a quality station or data input computer. When the inspection or repair is completed, the QC_FLAG is removed from the part. |
| HOLD_FLAG | Set using any computer with access to the machine network and a browser. The PLC responds to the detection of this flag in the same way it responds to a QC_FLAG. The difference between a QC_FLAG and a HOLD_FLAG is the way it is set and reset. While a QC_FLAG is automatically applied when a part is set to a quality station and reset when the check is completed, a HOLD_FLAG is applied only by persons granted special permissions using a network computer. A HOLD_FLAG is primarily used for isolating parts from a production line or lot control activities. |
| SCRAP_FLAG | Set by an operator using a quality station when the operator has determined that a part is scrap. This flag can only be removed by persons granted special permissions using a network computer. |
| PCS_ERROR | Sent to the PLC when the PCS cannot find a history for a part identifier or serial number. Used to prevent parts with duplicate identifiers or serial numbers from entering the system as well as preventing the system from recording multiple AREA_ON data for a single part. |
| PCS_DONE | Signal is sent to the PLC to indicate that the PCS has completed the requested function or procedure and that valid data is ready. |
| NEXT_PROCESS | Value sent to the PLC to indicate the next process for the part. It can be used to verify that a part has not skipped processes, or to direct the automation, for example a loader or robot, where the part needs to go next. |
| KICK_OUT ID | Value sent to the PLC to indicate a point in the process where the part must be removed or scrapped. It is used for set-up and testing. A number is assigned using a line side quality station. Once this parameter is set, a part travels through the processes until the designated kick out (or remove part) location is reached. The part is automatically rejected from the production line when the part reaches the identified kick out (or remove part) location. |

The flags that may be applied to parts in each parts history serve as electronic "tags" that indicate the status of a part and how the part may be handled. Because the flags are set and unset electronically, it is possible to further track the identity of a user that set or unset a flag. Under certain circumstances, it may be desirable to know, for example, what user released a hold on a part to allow it to proceed through production.

PLC to PCS Signal Timing

Figure 4:
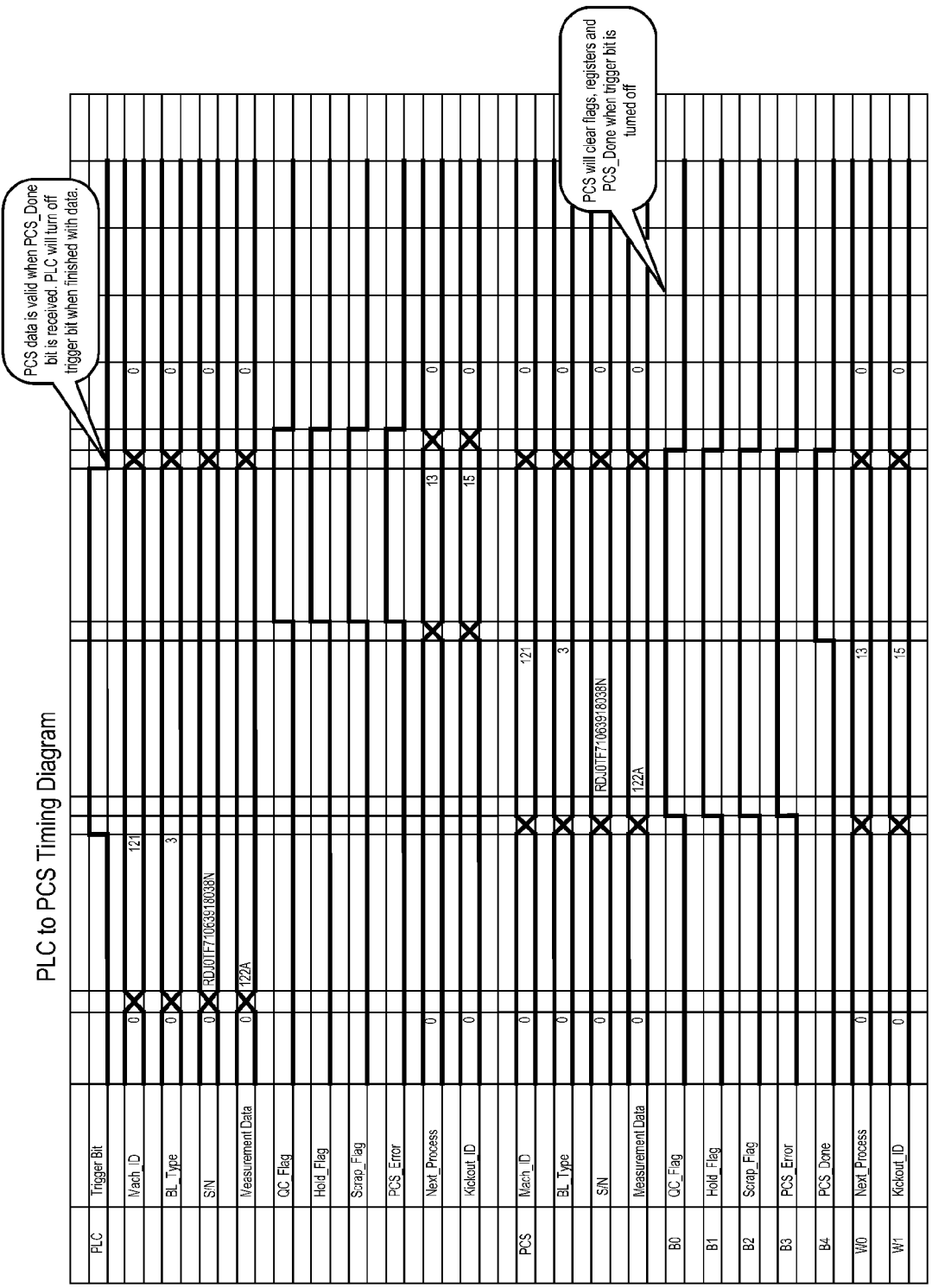
FIGS. 4 and 5 illustrate PLC programming details for a system according to an example embodiment of the present invention.

Referring to FIG. 4, an example PLC to PCS timing diagram according to a system for an example embodiment of the present invention is shown. The PLC moves the machine identifier (MACH_ID), process point type (PPT), part identifier or serial number and any data to be saved against the part number to the designated link registers. When the data is ready, the PLC turns "ON" the trigger bit. The PCS senses the trigger bit change of state and reads the data from the PLC. The PCS calls the requested function or procedure specified by the PPT setting. The PCS writes the return data, if any, to the status flags, NEXT_PROCESS and KICK_OUT ID (or remove part) link registers. When the PCS is finished, it sets the PCS_DONE bit. The PLC senses the PCS_DONE bit change and reads the return data from the link registers. When the PLC has captured the return data, it turns "OFF" the trigger bit.

The PCS senses the trigger bit change and clears all status flags, NEXT_PROCESS, and KICK_OUT ID (or remove part) link registers. When a new part history is created the NEXT_PROCESS number defaults to "1." When a MACH_OFF PPT is performed on a part, the NEXT_PROCESS number is updated to reflect the process that was just completed. The interface is then complete.

Figure 5A:
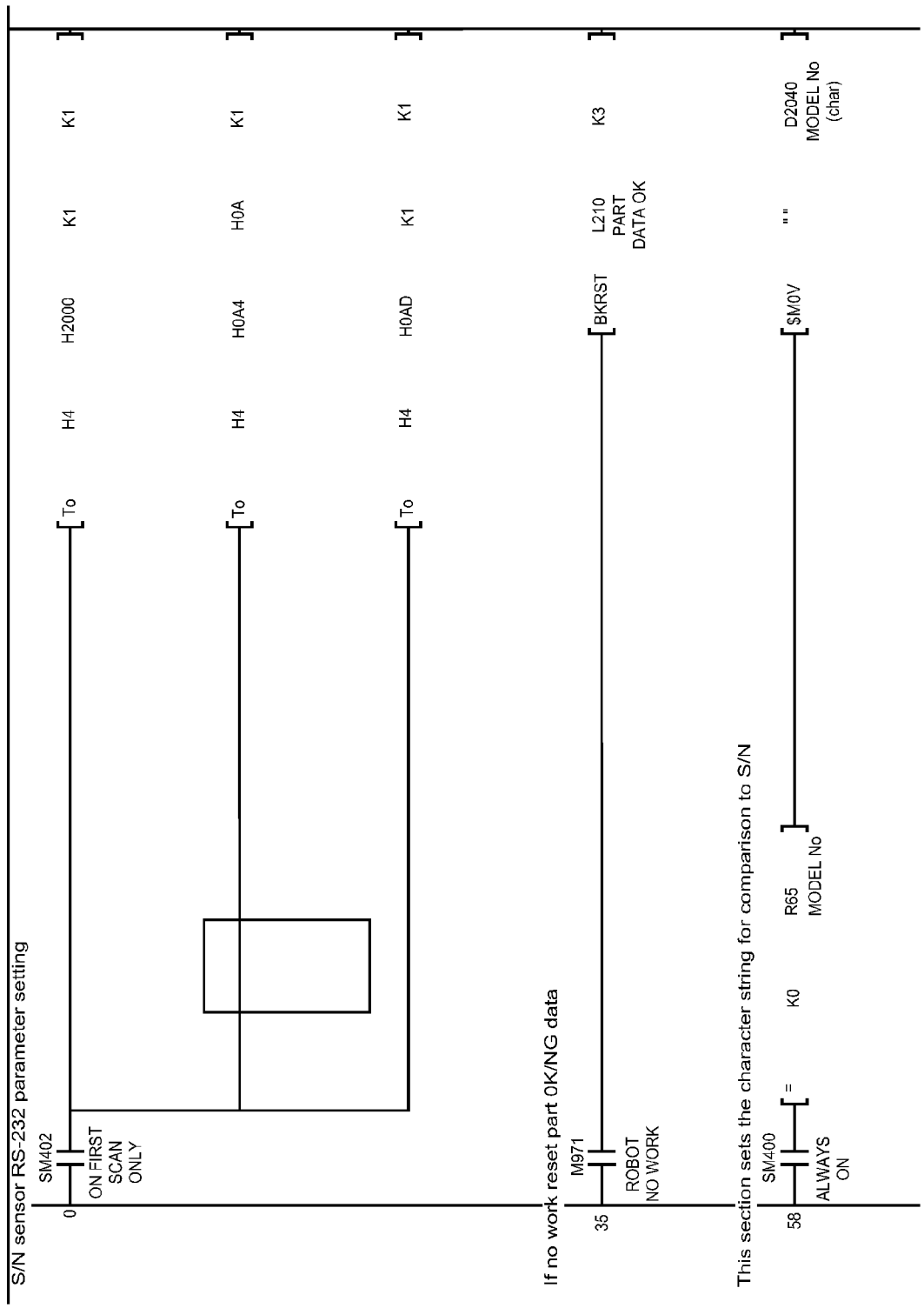
Figure 5B:
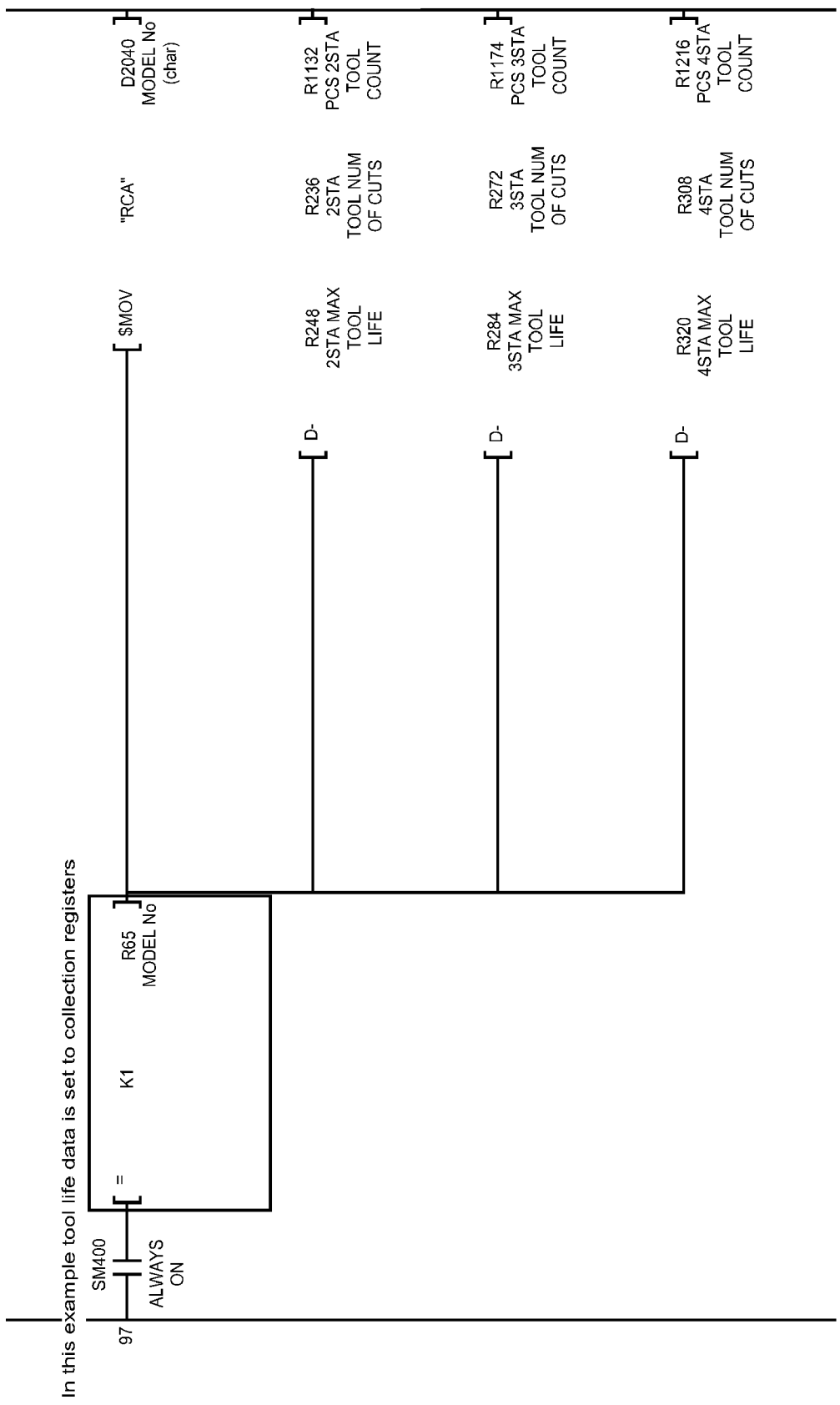
Figure 5C:
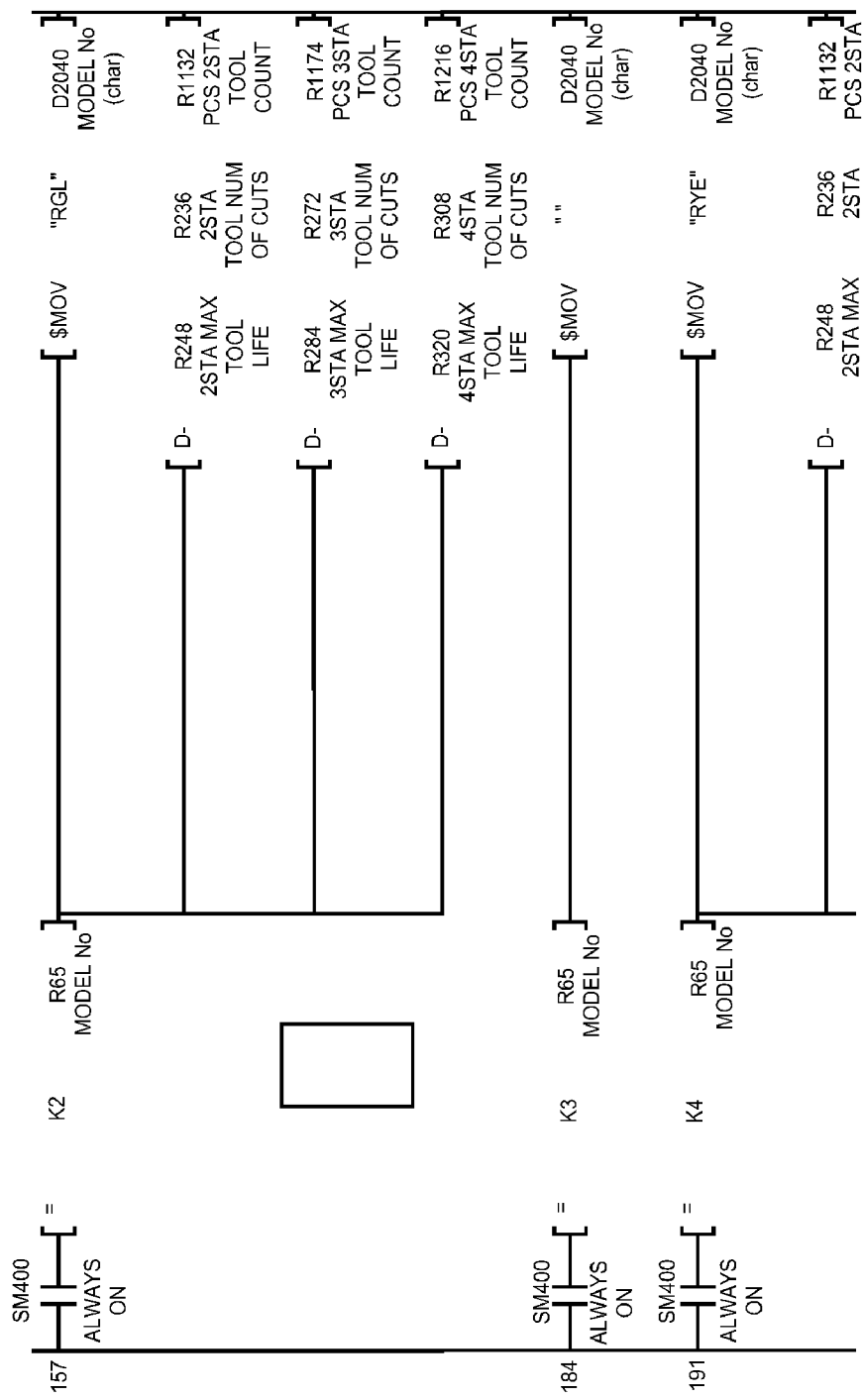

Referring to FIG. 5, a portion of PLC programming example for a Mitsubishi Q series processor is shown. The robot in this example loads two parts at a time. The part identifiers or serial numbers are read by a 2D barcode camera at machine input. The part identifiers or serial numbers are tracked to the end of the machine for data collection.

In the PCS to plant quality and tracking system interactions, PCS data is inserted or updated to the plant quality and tracking system by a database trigger. The following are the triggers and tables configured in the PCS database:

TABLE 7

| PCS to Plant Quality and Tracking System Communications | |
|---|---|
| Trigger | Action |
| AREA_ON | Trigger on Part Table handles AREA_ON Event |
| UPDATE | Trigger on Part Table handles AREA_OFF and QC_ON Events. |
| INSERT_PART_HISTORY | Trigger on PART_HISTORY table handles-PART_HISTORY Event. |

In plant quality and tracking system to PCS interactions, data inserts and updates to the PCS from the plant quality and tracking system occur through the invoking of a stored procedure in the PCS database. Procedures include remove part, line side hold, release hold, repair, scrap, and unscrap.

Analysis of Parts History Data and Reports

Figure 6:
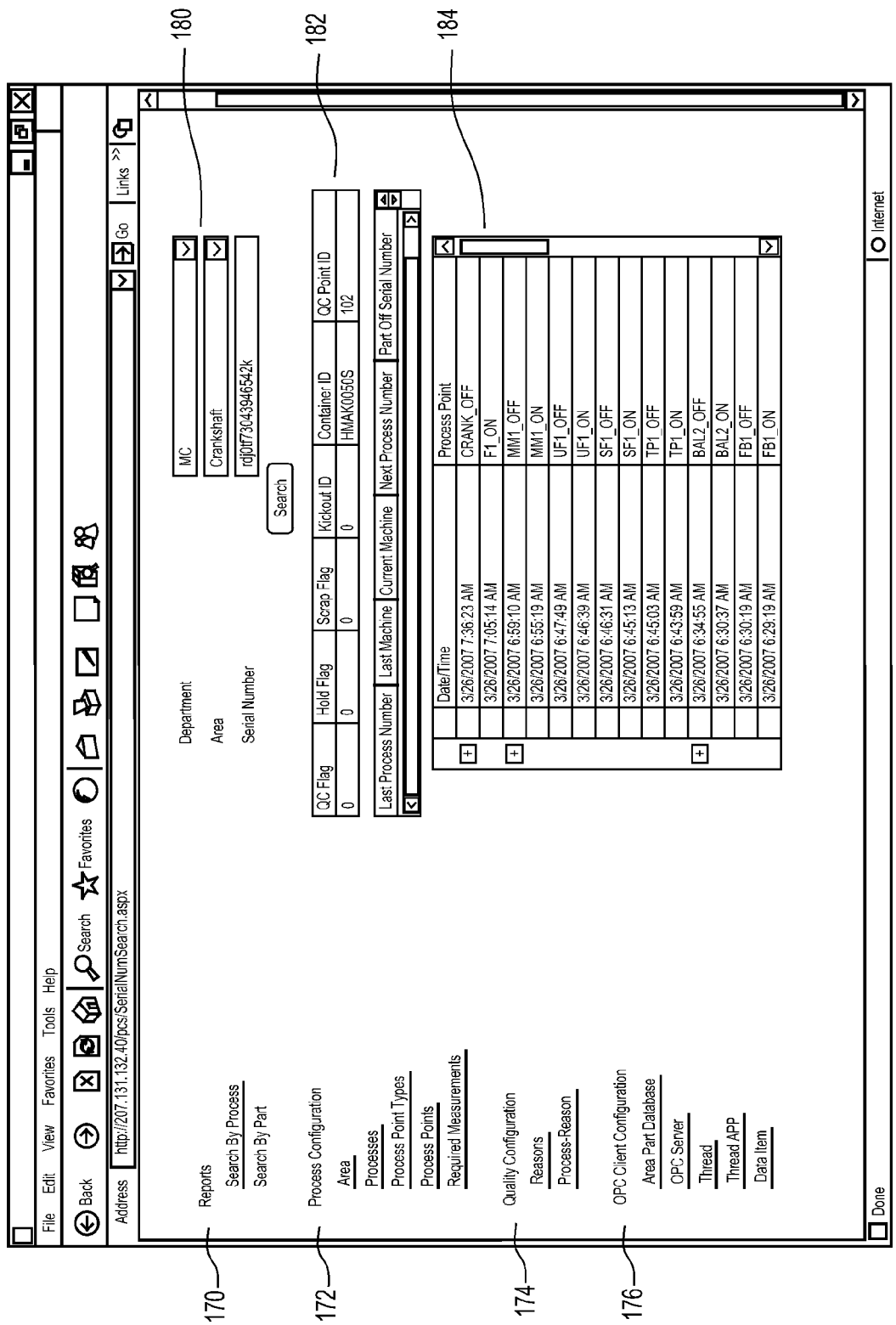

Referring to FIGS. 6-12, screens for a web-based administration and reporting application according to an example embodiment of the present invention are shown. Referring to FIG. 6, a screen shot illustrating user options for a web-based administration and reporting application according to an example embodiment of the present invention is shown. The left side of the screen comprises user selections related to the categories Reports 170 (Search by Process, Search by Part), Process Configuration 172 (Area, Processes, Process Point Types, Process Points, and Required Measurements), Quality Configuration 174 (Reasons, Process-Reason), and OPC Client Configuration 176 (Area Part Database, OPC Server, Thread, Thread APP, Data Item).

FIG. 6 further illustrates details of a "part identifier" report that presents detailed PCS traceability data for a specified department, area, and part identifier or serial number for a part. The traceability information may be located using a "search by part" option under the Reports section 170. The report displays status information for the part (lot control information) including a quality control flag, a hold flag, a scrap flag, a remove part location identifier (KICK_OUT ID), a container identifier, and a quality control point identifier, last process number, last machine, current machine, next process number and part off serial number 182. The screen comprises an area for displaying a complete process history 184 for the part. After specifying a department, an area, and a part identifier or serial number, the relevant data is located from the PCS database. The specific lot control data 182 is displayed and the complete process history 184 for the part may be organized in reverse chronological order according to the date/time stamp for each process point. The history indicates when each process for the part was completed.

Figure 7:
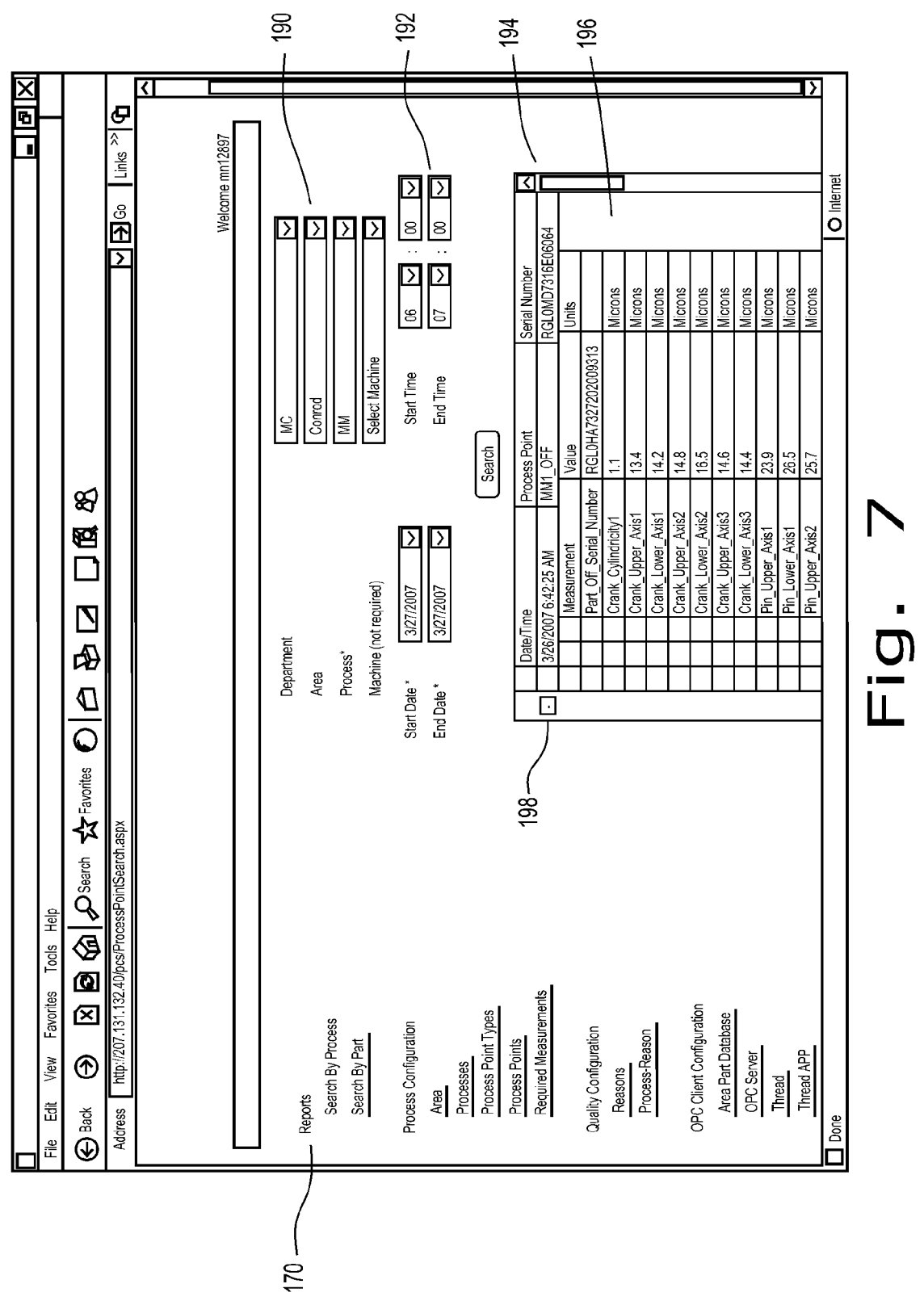

Referring to FIG. 7, a screen shot illustrating the display of data for a "process point" report according to an example embodiment of the present invention is shown. The process point data may be located using a "search by process" option under the Reports section 170. The screen comprises an area for selecting a department, an area, a process, and optionally, a machine 190. The screen also comprises an area for selecting a start date and time and an end date and time 192. After specifying these parameters, the PCS database may be searched to locate process points completed during the specified time period as well as the related part identifier or serial number 194. The related measurement data may also be displayed 196. A minus symbol to the left of the row selector for the row 198 allows the user to close the grid that includes the required measurements for that row.

FIGS. 8-12 illustrate use of the system of the present invention to identify and isolate suspect parts on a production line and to identify a machine that may be producing suspect parts. A part may be identified as suspect following a visual inspection by a production line associate or by a machine inspection on the production line or by using any other means for detecting defective parts. Once a suspect part is detected, data analysis and reporting features of the present invention may be used to identify the machine producing the suspect part.

Figure 8:
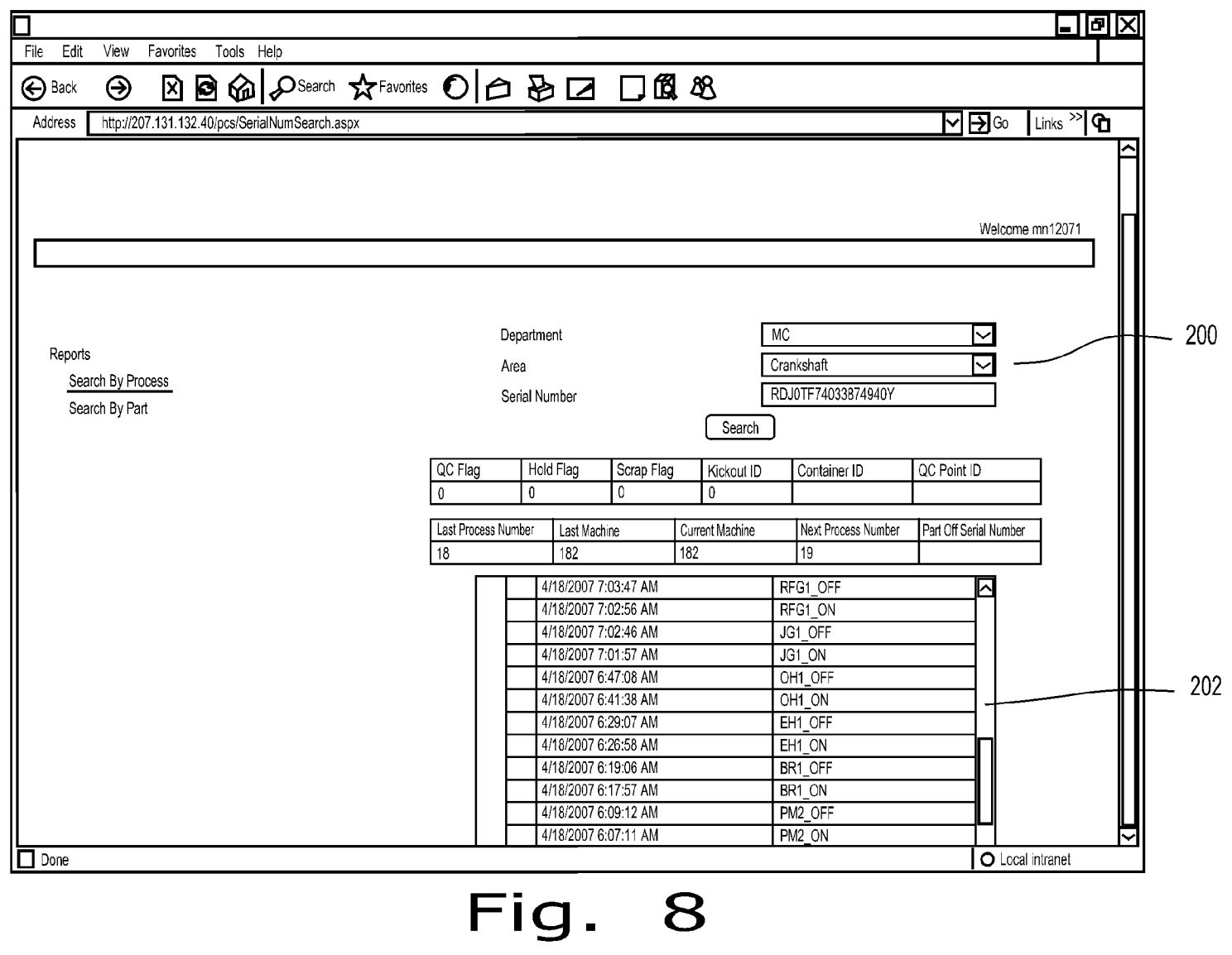

Referring to FIG. 8, after specifying a department, an area, and a part identifier or serial number 200 for the suspect part (e.g., RDJOTF74033874940Y), a complete process history is displayed. The complete part history indicates when the process attributable to the problem on the suspect part was performed. For example, if inspection of the suspect part suggests a problem with an oil hole drilling process (OH1) 202, review of the example part history data indicates that the OH1 process was completed on the part on Apr. 18, 2007 between 6:41:38 and 6:47:08 AM.

Referring to FIG. 9, the results of a query in the plant quality and tracking system shows all parts completing the OH1 process on April 18. The suspect part may be located within the results 210. Referring to FIG. 10, from the query results, an initial range of suspect parts 220 (e.g., plus or minus 20 parts from the suspect part 210) may be identified. Initiation of a hold action (HOLD_ON) on the parts in the range of suspect parts results in the automatic removal of parts from the production line as PLCs reject the parts when they arrive for processing. The hold action for the selected parts is communicated from the plant quality and tracking system to the PCS and from the PCS to the PLCs. Once the hold information is communicated to the PLCs, the parts may be removed from production as they are rejected by PLCs during subsequent production line processing. The PCS to PLC communication facilitates the fast and efficient removal of suspect parts from the production line by causing production line equipment to reject parts and direct them to "no good" chutes as the PLCs determine from data received from the PCS that further processing on the parts should not be completed.

Figure 11:
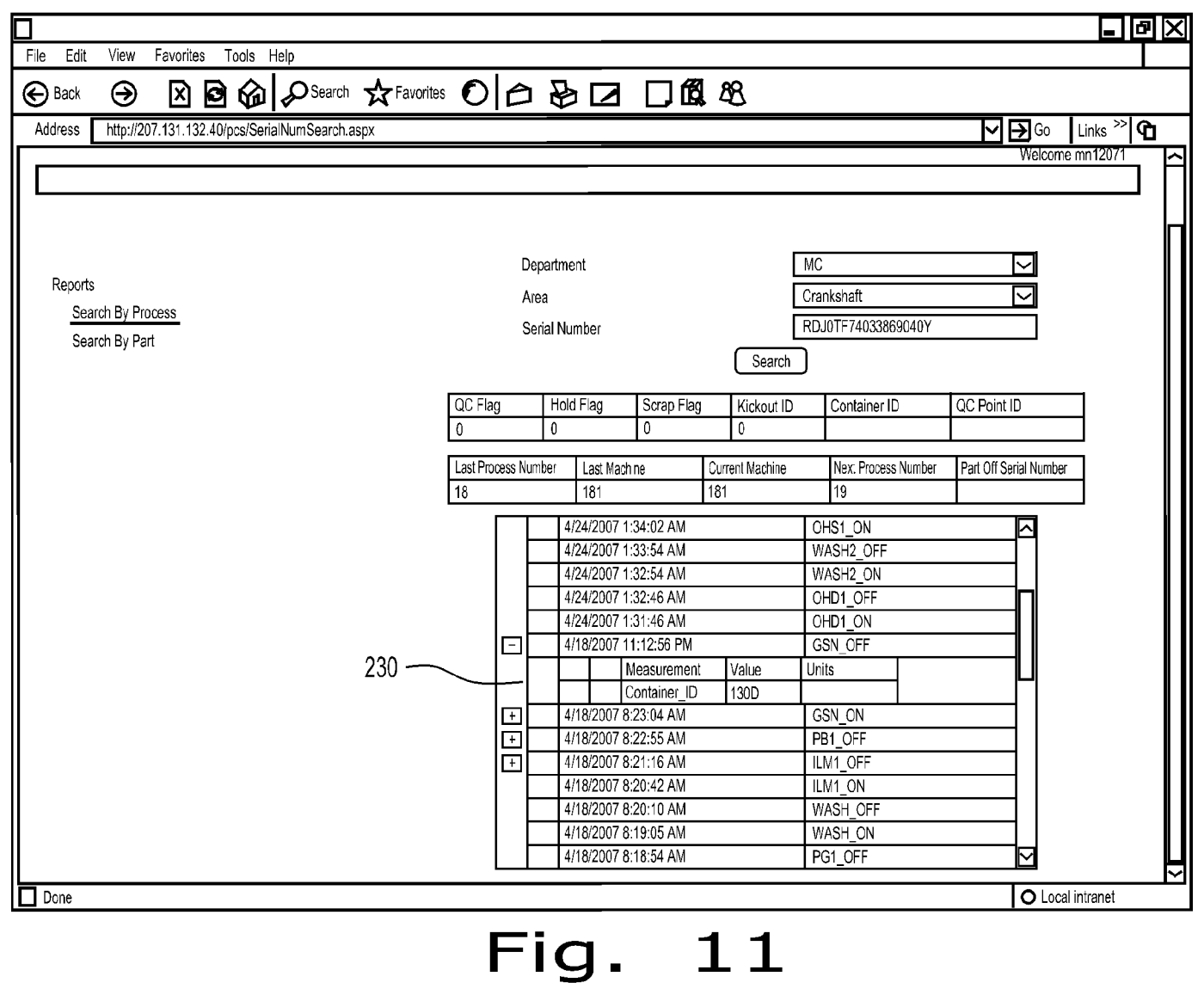

A complete part history may then be completed for one or more parts selected from the range of parts 220. For example, if the hold action on 40 parts results in the rejection of 39 parts for further processing and the identification of one part as missing 222, the complete part history for the missing part may be reviewed. Referring to FIG. 11, the complete part history provides information about the missing part 230 and may be used to determine the current location of the missing part. An investigation of the recorded machine history during the suspect part runtime may assist a production line associate in identifying the source of the problem. In the oil hole processing example, the problem may be attributable to a machine or equipment malfunction that the associate can then correct (e.g., a chipped drill that occurred during a tool change during the suspect parts run time).

Figure 12:
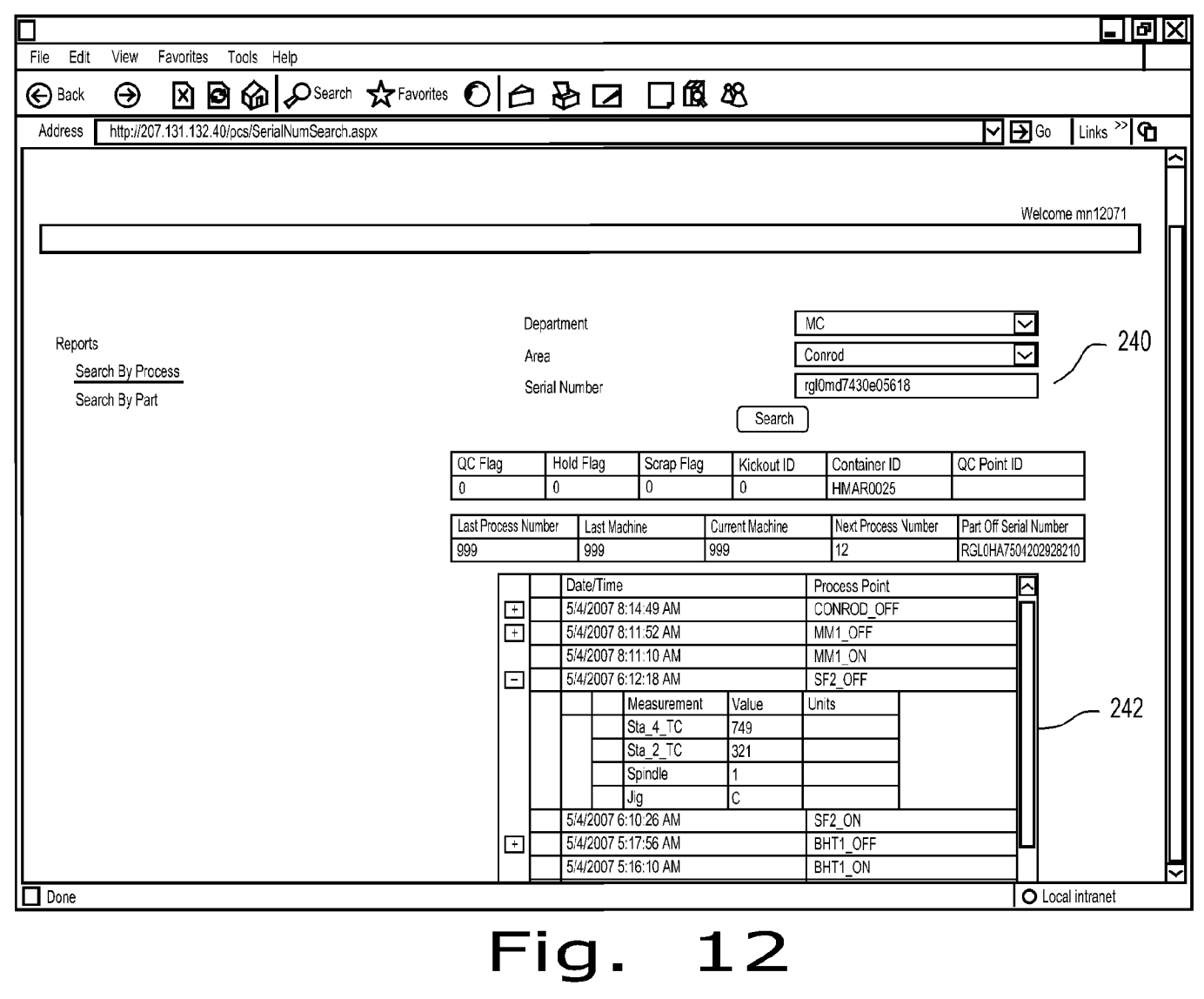

Problems with production line machines may also be identified when parts are removed (kicked out) from production when measurement machines or associates reject them for quality nonconformance. An analysis of the removed parts results in the identification of processes that could be responsible for the problem. A review of the parts history for the rejected parts may be completed to identify a machine process that is causing the problem. Referring to FIG. 12, review of suspect processes 242 within complete part histories for each specified part 240 may indicate that each rejected part came from the same machine. Once the machine is identified, an associate may inspect or examine the machine to identify and correct the problem (e.g., loose clamp). The ability to trace and analyze the complete process history for each part facilitates the identification of the machine on the production line responsible for the problem.

The system and method of the present invention provides many benefits to manufacturers. It prevents abnormal parts from moving from one to the next process. Parts that do not have a correct process history are not accepted by PLCs and may be directed to a "no good" chute of parts. Because suspect parts are rejected by PLCs and in some instances removed from the production line, the likelihood that suspect parts are used in production is reduced. Rejection of parts by the PLCs further provides associates on the production line with an opportunity to investigate a problem and possibly prevent additional or larger problems from occurring. Data from complete part histories may be analyzed to identify processes and machines that are potentially causing quality problems. The system and method of the present invention reduce the need to rely on inspections because it is easier to isolate quality problems on machinery when they occur.

While certain embodiments of the present invention have been described in detail above for purposes of illustration, the scope of the invention is not to be considered limited by such disclosure, and modifications are possible without departing from the spirit of the invention as evidenced by the following claims:

What is claimed is:

1. A computerized method for collecting and storing to a real-time database data for processes completed by machines on a production line comprising:
  (a) defining a plurality of machine process points wherein each machine process point comprises one or more machine operations performed by a machine on said production line;
  (b) associating a process point identifier with each of said plurality of machine process points;
  (c) assigning a unique machine identifier to each machine on a production line wherein each machine identifier comprises a process point identifier;
  (d) defining a plurality of process point settings wherein each of said plurality of process point settings refers to a machine operation performed by each machine on said production line;
  (e) associating with each of said plurality of process point settings a plurality of computer instructions regarding said machine operation performed by said machine on said production line;
  (f) storing in a database on a computer said unique machine identifiers, said plurality of process point settings, and said computer instructions associated with each of said plurality of process point settings;
  (g) receiving at said computer from a controller of a machine on said production line a machine identifier, one of said plurality of process point settings, and a part identifier for a part processed by said machine;
  (h) retrieving from said database said computer instructions associated with said one of said plurality of process point settings;
  (i) executing at said computer said computer instructions associated with said one of said plurality of process point settings;
  (j) recording in said database said part identifier; and
  (k) recording in said database in association with said part identifier data related to results of said computer instructions executed at said computer according to said one of said plurality of process point settings.

2. The method of claim 1 further comprising:
  (l) receiving at said computer from said controller data related to operations performed by said machine; and
  (m) recording in said database in association with said part identifier said data related to operations performed by said machine.

3. The method of claim 2 wherein receiving at said computer from said controller data related to operations performed by said machine comprises receiving at said computer data regarding a status of said part processed by said machine.

4. The method of claim 3 wherein said status is selected from the group consisting of a quality control flag, a hold flag, and a scrap flag.

5. The method of claim 1 wherein associating a process point identifier with each of said plurality of machine process points comprises assigning to each process point a number in numerical order starting at 1.

6. The method of claim 1 wherein said process point settings are selected from the group consisting of area on, pick up, machine off, quality control on, set process, load, area off, and machine on.

7. The method of claim 6 further comprising:
  (l) determining at said computer if said one of said plurality of process point settings is a pick up setting;
  (m) executing computer instructions for said process point setting pick up wherein said computer instructions comprise:

(i) retrieving part history data for said part processed by said machine using said part identifier wherein said part history data indicates whether said part should be accepted or rejected by said controller; and (ii) returning to said controller data relevant to said part history data.

8. The method of claim 7 wherein said controller accepts or rejects said part according to said data relevant to said part history.

9. The method of claim 8 further comprising removing said part from said production line if said controller rejects said part according to said data relevant to said part history data.

10. The method of claim 1 further comprising transferring said data recorded at said computer to a plant quality and tracking system.

11. A computerized system for collecting and storing to a real-time database data for processes completed by machines on a production line comprising:

a plurality of line controllers, each of said line controllers adapted to control operations performed by said machines on said production line and adapted to transmit and receive data related to parts processed at said machines;

a process control system computer in communication with said plurality of line controllers, said process control system computer comprising said real-time database for storing:

(i) process point identifiers wherein each process point identifier is associated with a plurality of machine process points comprising one or more machine operations performed by a machine on said production line;

(ii) unique machine identifiers identifying each machine on said production line wherein each machine identifier comprises a process point identifier;

(iii) process point settings wherein each process point setting refers to a machine operation performed by each machine on said production line; and (iv) a plurality of computer instructions associated with each process point setting wherein said computer instructions relate to said machine operations performed by said machines on said production line;

wherein said process control system computer:

(a) receives at said computer from a controller of a machine on said production line a machine identifier, a process point setting, a part identifier for a part processed by said machine;

(b) retrieves from said real-time database said computer instructions associated with said process point setting;

(c) executes at said computer said computer instructions associated with said process point setting;

(d) records in said database said part identifier; and (e) records in said database in association with said part identifier data related to results of said computer instructions executed at said computer according to said process point setting.

12. The system of claim 11 wherein said process control system computer further:

(f) receives from said controller data related to operations performed by said machine; and (g) records in said real-time database in association with said part identifier said data related to operations performed by said machine.

13. The system of claim 12 wherein said data related to operations performed by said machine comprises data regarding a status of said part processed by said machine.

14. The system of claim 13 wherein said status is selected from the group consisting of a quality control flag, a hold flag, and a scrap flag.

15. The system of claim 11 wherein said unique machine identifiers comprising process point identifiers comprise process point numbers assigned in numerical order starting at 1.

16. The system of claim 11 wherein said process point settings are selected from the group consisting of area on, pick up, machine off, quality control on, set process, load, area off, and machine on.

17. The system of claim 16 wherein said process system control computer further:

(h) determines if said process point setting is a pick up setting;

(i) executes computer instructions for said process point setting pick up wherein said computer instructions comprise:

(i) retrieving part history data for said part processed by said machine using said part identifier wherein said part history data indicates whether said part should be accepted or rejected by said controller; and (ii) returning to said controller data relevant to said part history data.

18. The system of claim 17 wherein said controller accepts or rejects said part according to said data relevant to said part history.

19. The system of claim 18 wherein said controller removes said part from said production line if said controller rejects said part according to said data relevant to said part history data.

20. The system of claim 11 wherein said data recorded at said process system control computer is further transferred to a plant quality and tracking system.

21. A computerized method for controlling processes completed by machines on a production line comprising:

(a) assigning a unique machine identifier to each machine on a production line wherein each machine identifier comprises a process point identifier related to one or more machine operations performed by a machine on said production line;

(b) defining a plurality of process point settings wherein each one of said plurality of process point settings refers to a machine operation performed by each machine on said production line;

(c) associating with each process point setting a plurality of computer instructions regarding said machine operation performed by said machine on said production line;

(d) storing in a database on a process control system computer said unique machine identifiers, said process point settings, and said computer instructions associated with each process point setting;

(e) storing in said database part identifier and part status information for parts processed on said production line;

(f) receiving at said process control system computer from a controller of a machine on said production line a machine identifier, a process point setting, and a part identifier for a part processed by said machine;

(g) executing at said process control system computer said computer instructions associated with said process point setting;

(h) retrieving from said database part status information associated with said part identifier; and (i) transmitting to said controller said part status information for processing of said part by said controller according to said part status information.

22. The method of claim 21 wherein transmitting to said controller said part status information for processing of said part by said controller according to said part status information comprises transmitting to said controller a scrap status indicator.

23. The method of claim 22 wherein said controller responds to said scrap status indicator by directing said part to a chute to remove said part from said production line.

24. The method of claim 21 wherein transmitting to said controller said part status information for processing of said part by said controller according to said part status information comprises transmitting to said controller a quality control status indicator.

25. The method of claim 24 wherein said controller responds to said quality control status indicator by directing said part to a quality control station.

26. The method of claim 21 wherein transmitting to said controller said part status information for processing of said part by said controller according to said part status information comprises transmitting to said controller a remove part location identifier.

27. The method of claim 26 wherein said part is removed from said production line by a controller when said part reaches said remove part location identifier.

28. The method of claim 21 wherein transmitting to said controller said part status information for processing of said part by said controller according to said part status information comprises transmitting to said controller a next process identifier.

29. The method of claim 28 wherein said part is moved to another controller on said production line according to said next process identifier.

30. The method of claim 21 further comprising:
(j) receiving at said process control system computer from said controller additional information regarding processing of said part at said machine; and
(k) storing in said database in association with said part identifier said additional information regarding processing of said part at said machine.

* * * * *